United States Patent
Ha et al.

(10) Patent No.: US 6,888,597 B2
(45) Date of Patent: May 3, 2005

(54) METHOD OF ARRAY SUBSTRATE FOR TRANSFLECTIVE LIQUID CRYSTAL DISPLAY DEVICE

(75) Inventors: Kyoung-Su Ha, Seoul (KR); Houm-il Baek, Seoul (KR); Dong-guk Kim, Seoul (KR); Tao-yong Jung, Daegu (KR); Hye-young Kim, Daejeon (KR); Mi-sook Nam, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 214 days.

(21) Appl. No.: 10/259,834

(22) Filed: Sep. 30, 2002

(65) Prior Publication Data

US 2003/0123001 A1 Jul. 3, 2003

(30) Foreign Application Priority Data

Dec. 28, 2001 (KR) .......................................... 2001-87616

(51) Int. Cl.⁷ .............................................. G02F 1/1335
(52) U.S. Cl. .......................... 349/114; 349/11; 438/149; 438/151; 438/158; 438/161
(58) Field of Search ................................. 349/114, 113; 428/149, 151, 158, 161

(56) References Cited

U.S. PATENT DOCUMENTS 6,620,655 B2 * 9/2003 Ha et al. ..................... 438/149

* cited by examiner

Primary Examiner—Tarifur R. Chowdhury
Assistant Examiner—George Y. Wang
(74) Attorney, Agent, or Firm—McKenna Long & Aldridge LLP

(57) ABSTRACT

A manufacturing method of an array substrate for a transflective liquid crystal display device includes forming a gate insulator on a gate line and a gate electrode formed on a substrate. A data line, source and drain electrodes are formed on an ohmic contact layer formed on an active layer on the gate insulator. A first passivation layer made of a first material is deposited on the data line, source and drain electrodes. A second passivation layer made of a second material is deposited on the first passivation layer. The second passivation layer is patterned, thereby forming a first drain contact hole exposing the first passivation layer over the drain electrode. A reflector is formed on the second passivation layer, the reflector having a first transmissive hole The first passivation layer is patterned thereby forming a second drain contact hole exposing the drain electrode. The second drain contact hole corresponds to the first drain contact hole. A transparent electrode is formed on the second passivation layer and on the reflector, wherein the transparent electrode is connected to the drain electrode through the first and second drain contact holes.

22 Claims, 13 Drawing Sheets

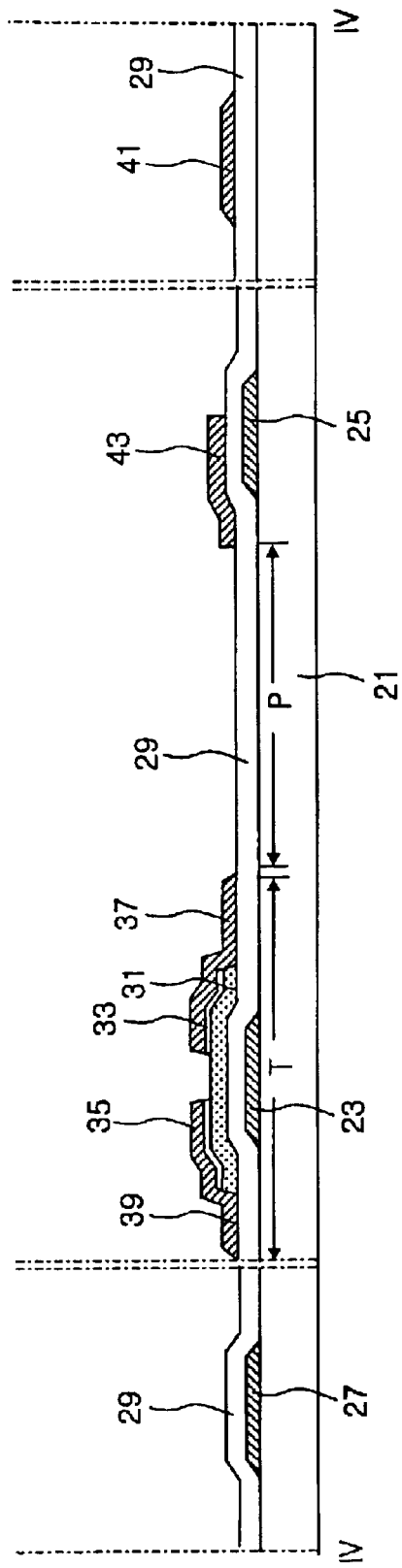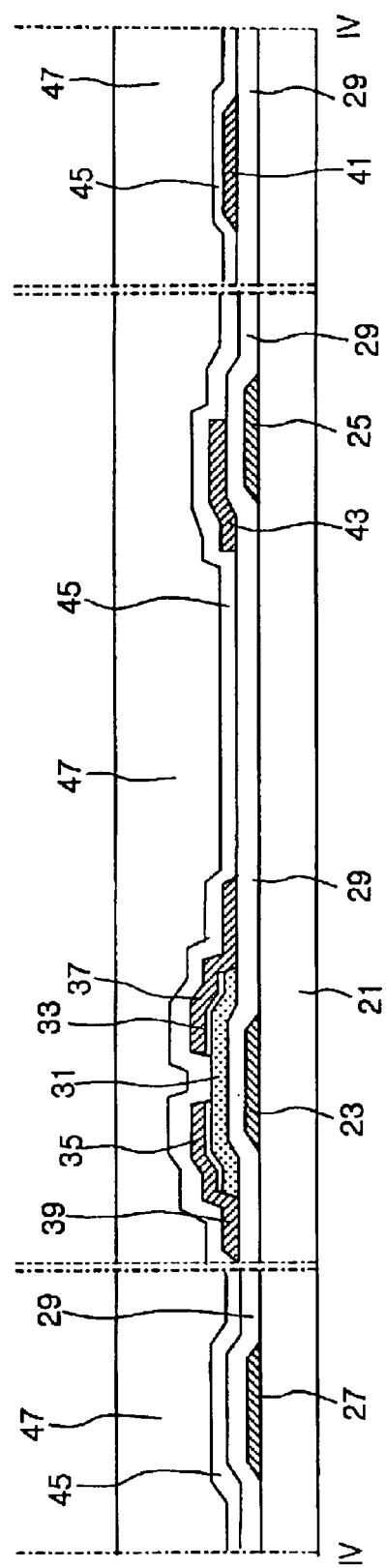
FIG. 4A (RELATED ART)
FIG. 4B (RELATED ART)

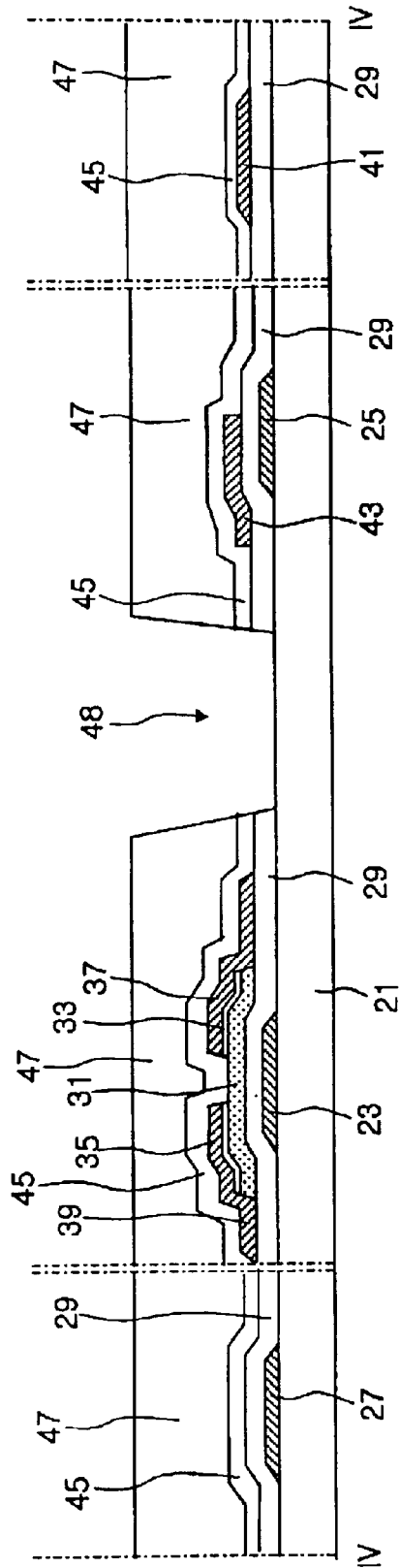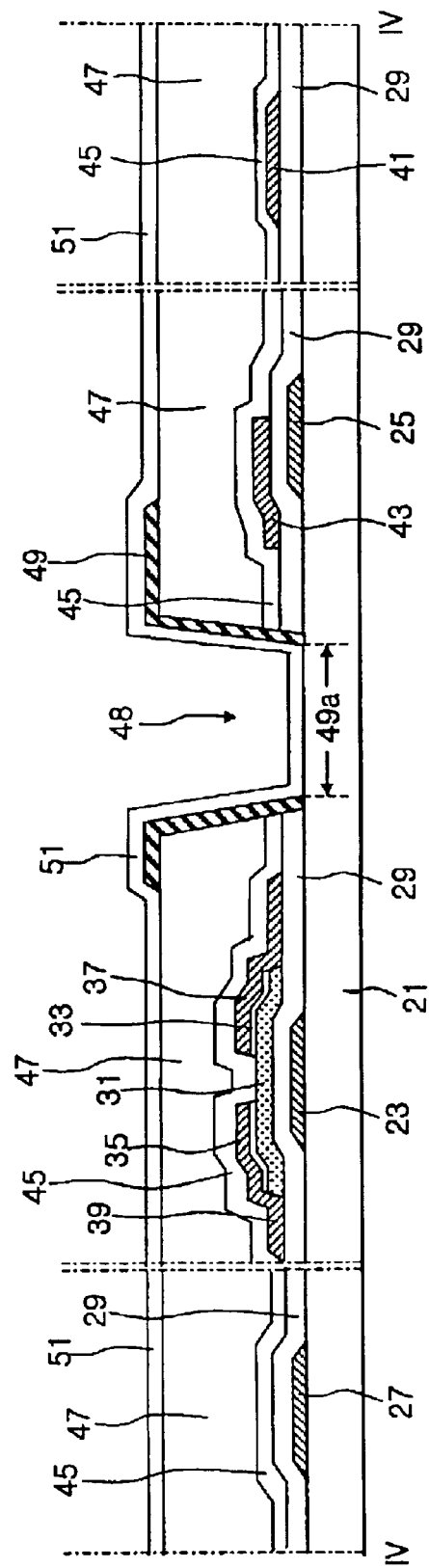
FIG. 4C (RELATED ART)
FIG. 4D (RELATED ART)

METHOD OF ARRAY SUBSTRATE FOR TRANSFLECTIVE LIQUID CRYSTAL DISPLAY DEVICE

This application claims the benefit of Korean Patent Application No. 2001-87616, filed on Dec. 28, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a manufacturing method of an array substrate for a transflective liquid crystal display (LCD) device.

2. Discussion of the Related Art

In general, the liquid crystal display (LCD) device includes two substrates, which are spaced apart and facing each other, and a liquid crystal layer interposed between the two substrates. Each of the substrates includes an electrode and the electrodes of each substrate are also facing each other. Voltage is applied to each electrode and an electric field is induced between the electrodes. An arrangement of the liquid crystal molecules is changed by varying intensity of the electric field. The LCD device displays a picture by varying transmittance of the light intensity according to the arrangement of the liquid crystal molecules.

Because the liquid crystal display (LCD) device is not luminescent, it needs an additional light source in order to display images. The liquid crystal display device is categorized into a transmissive type and a reflective type depending on the kind of light source.

In the transmissive type, a backlight behind a liquid crystal panel is used as a light source. Light incident from the backlight penetrates the liquid crystal panel, and the amount of the transmitted light is controlled depending on the arrangement of the liquid crystal molecules. Here, the substrates are usually transparent and the electrodes of each substrate are usually formed of transparent conductive material. As the transmissive liquid crystal display (LCD) device uses the backlight as a light source, it can display a bright image in dark surroundings. Because an amount of the transmitted light is very small for the light incident from the backlight, the brightness of the backlight must be increased in order to increase the brightness of the LCD device. Consequently, the transmissive liquid crystal display (LCD) device has high power consumption due to the operation of the backlight.

On the other hand, in the reflective type LCD device, sunlight or artificial light is used as a light source of the LCD device. The light incident from the outside is reflected at a reflective plate of the LCD device according to the arrangement of the liquid crystal molecules. Since there is no backlight, the reflective type LCD device has much lower power consumption than the transmissive type LCD device. However, the reflective type LCD device cannot be used in dark surroundings because it depends on an external light source.

Therefore, a transflective LCD device, which can be used both in a transmissive mode and in a reflective mode, has been recently proposed. A related art transflective LCD device will be described hereinafter more in detail.

FIG. 1 is an exploded perspective view illustrating a related art transflective LCD device. The related art transflective LCD device 11 has upper and lower substrates 15 and 21, which are spaced apart from and facing each other, and also has a liquid crystal layer 14 interposed between the upper substrate 15 and the lower substrate 21.

A gate line 25 and a data line 39 are formed on the inner surface of the lower substrate 21. The gate line 25 and the date line 39 cross each other to define a pixel area "P". The pixel area "P" includes a transmissive region "A" and a reflective region "B". A thin film transistor "T" is situated at the crossing of the gate line 25 and the data line 39. A reflective electrode 49 having a transmissive hole 49a and a transparent electrode 61 overlapping the reflective electrode 49 are formed in the pixel area "P". The reflective electrode 49 and the transparent electrode 61 are connected to the thin film transistor "T". The transmissive hole 49a corresponds to the transmissive region "A".

Meanwhile, a black matrix 16, which has an opening corresponding to the reflective electrode 49 and the transparent electrode 61, is formed on the inside of the upper substrate 15, and a color filter 17 corresponding to the opening of the black matrix 16 is formed on the black matrix 16. The color filter 17 is composed of three colors: red (R), green (G) and blue (B). Each color corresponds to each pixel area "P". Subsequently, a common electrode 13 is formed on the color filter 17.

FIG. 2 is a schematic cross-sectional view of a related art transflective LCD device. FIG. 2 indicates a pixel area of the related art transflective LCD device. In the related art transflective LCD device 11, a transparent electrode 61 is formed on the inner surface of a lower substrate 21 and an insulating layer 50 is formed on the transparent electrode 61. A reflective electrode 49 is formed on the insulating layer 50, and the reflective electrode 49 has a transmissive hole 49a corresponding to a transmissive region "A". As stated above, the lower substrate 21 includes a gate line, a data line and a transistor thereon though not shown in the figure.

An upper substrate 15 is spaced apart from and facing the lower substrate 21. A common electrode 13 is formed on the inner surface of the upper substrate 15. Though not shown in the figure, a black matrix and a color filter are subsequently formed between the upper substrate 15 and the common electrode 13.

A liquid crystal layer 14 is disposed between the lower and upper substrates 21 and 15, and molecules of the liquid crystal layer 14 are arranged horizontally with respect to the substrates 21 and 15.

Polarizers (not shown) are arranged on the outer surface of the lower and upper substrate 21 and 15. The transmission axes of polarizers are perpendicular to each other.

A backlight 41 is located under the outside of the lower substrate 21. The backlight 41 is used as a light source of a transmissive mode of the transflective LCD device.

In a reflective mode, light "F2" incident from the outside such as sunlight or artificial light passes through the liquid crystal layer 14 and is reflected at the reflective electrode 49 in a reflective region "B". The light "F2" goes through the liquid crystal layer 14 again and is emitted. At this time, the amount of emitted light "F2" is controlled according the arrangement of liquid crystal molecules.

On the other hand, in a transmissive mode, light "F1" from the back light 41 penetrates the transparent electrode 61 in the transmissive region "A". Next, while the light "F1" passes through the liquid crystal layer 14, the amount of the light "F1" is controlled according to the arrangement of liquid crystal molecules.

FIG. 3 shows a plan view of an array substrate for a related art transflective liquid crystal display (LCD) device.

In FIG. 3, a gate line 25 is formed horizontally and a data line 39 is formed vertically in the context of the figure. The gate and data lines 25 and 39 cross each other and define a pixel region "P". At the crossing of the gate and data lines 25 and 39, a thin film transistor "T" is formed. The thin film transistor "T" is electrically connected to the gate and data lines 25 and 39, and includes a gate electrode 23, a source electrode 35, a drain electrode 37, and an active layer 31.

In the pixel region "P", a reflective electrode 49 and a transparent electrode 61 are formed. The reflective electrode 49 has a transmissive hole 49a. The transparent electrode 61 overlaps the drain electrode 37 and is connected to the drain electrode 37 through a drain contact hole 53.

A capacitor electrode 43, which overlaps the gate line 25, is formed and is connected to the transparent electrode 61 through a capacitor contact hole 55. The capacitor electrode 43 forms a storage capacitor "C" with the gate line 25.

A gate pad 27 is formed at one end of the gate line 25 and a data pad 41 is formed at one end of the data line 39. A gate pad terminal 63 and a data pad terminal 65, which overlap the gate pad 27 and the data pad 41, respectively, are formed. The gate pad 27 is connected to the gate pad terminal 63 through a gate pad contact hole 57 and the data pad 41 is connected to the data pad terminal 65 through a data pad contact hole 59.

FIGS. 4A to 4F are cross-sectional views illustrating a method of manufacturing the array substrate of FIG. 3, and correspond to cross-sections along the line IV—IV of FIG. 3.

First, as shown in FIG. 4A, a gate electrode 23, a gate line 25 and a gate pad 27 are formed on a substrate 21. As stated above, the gate pad 27 is formed at one end of the gate line 25. A gate insulator 29 is formed on the gate electrode 23, the gate line 25 and the gate pad 27. Next, an active layer 31 and an ohmic contact layer 33 are subsequently formed on the gate insulator 29. The active layer 31 and the ohmic contact layer 33 are disposed over the gate electrode 23.

A data line 39, source and drain electrodes 35 and 37 are formed on the ohmic contact layer 33. Also, a capacitor electrode 43 and a data pad 41 are formed on the gate insulator 29. As stated above, the data line 39 crosses the gate line 25 to define a pixel region "P". The capacitor electrode 43 and a data pad 41 are made of substantially the same material as the source and drain electrodes 35 and 37. The source and drain electrodes 35 and 37 form a thin film transistor "T" with the gate electrode 23. The capacitor electrode 43 overlaps the gate line 25 to form a storage capacitor.

In FIG. 4B, a first passivation layer 45 is formed on the source and drain electrodes 35 and 37, the capacitor electrode 43, and the data pad 41. Next, a second passivation layer 47 is formed on the first passivation layer 45. The first passivation layer 45 is made of an inorganic material such as silicon nitride (SiNx) or silicon oxide ($SiO_2$). The second passivation layer 47 is made of an organic material such as benzocyclobutene (BCB) or acrylic resin. The second passivation layer 47 flattens the surface of the substrate 21 having the thin film transistor "T" and minimizes electrical couplings between the gate line or the data line and the reflector, which will be formed later.

As shown in FIG. 4C, the second passivation layer 47, the first passivation layer 45 and the gate insulator 29 are patterned and a first transmissive hole 48 is formed. Accordingly, the substrate 21 is exposed. The presence of the first transmissive hole 48 causes a thickness of a liquid crystal layer in a transmissive region to be thicker than that of a liquid crystal layer in a reflective region, and optimizes the optical characteristic of a transmissive mode with the optical characteristic of a reflective mode, simultaneously.

Next, in FIG. 4D, a reflector 49 is formed on the second passivation layer 47 and a third passivation layer 51 is formed on the reflector 49. The reflector 49 has a second transmissive hole 49a corresponding to the first transmissive hole 48. The reflector 49 is made of a metal that reflects light well, such as aluminum (Al). The reflector 49 may be formed of either aluminum (Al) or an alloy of aluminum and neodymium (AlNd). The third passivation layer 51 is made of an inorganic material.

In FIG. 4E, the third passivation layer 51 is patterned with the second passivation layer 47, the first passivation layer 45 and the gate insulator 29, so that a drain contact hole 53, a capacitor contact hole 55, a gate pad contact hole 57 and a data pad contact hole 59 are formed. A third transmissive hole 52 is also formed and the third transmissive hole 52 corresponds to the first and second transmissive holes 48 and 49a. The drain contact hole 53 exposes the drain electrode 37, the capacitor contact hole 55 exposes the capacitor electrode 42, the gate pad contact hole 57 exposes the gate pad 27, and the data pad contact hole 59 exposes the data pad 41. The drain, capacitor, gate pad and data pad contact holes 53, 55, 57 and 59 may have a taper, a lower width of which is narrower than an upper width.

As shown in FIG. 4F, a transparent electrode 61, a gate pad terminal 63 and a data pad terminal 65 are formed. The transparent electrode 61 is connected to the drain electrode 37 and the capacitor electrode 43 through the drain and capacitor contact holes 53 and 55, respectively. The gate and data pad terminals 63 and 65 are connected to the gate and data pads 27 and 41 through the gate and data pad contact holes 57 and 59, respectively.

FIG. 5 is a cross-sectional view magnifying the gate pad area "D" of FIG. 4F. In the above method of manufacturing an array substrate for a transflective LCD device, the gate insulator 29 and the first to third passivation layers 45, 47 and 51 are etched one at a time in order to form the contact holes 53, 55, 57 and 59. The etch rate of each layer is not equal to each other because of various constituent materials, i.e., an organic material and an inorganic material. Therefore, the contact holes 53, 55, 57 and 59 have a reverse taper shape in parts "E" due to the different etching rates of the organic material and the inorganic material. Accordingly, the transparent electrode 61 can become disconnected between the organic material and inorganic material in the vicinity of the reverse taper shape.

Additionally, since most of the layers are etched, including the gate insulator 29, and the first to third passivation layers 45, 47 and 51, in order to form the gate pad contact hole 57 exposing the gate pad 27, a photoresist layer (not shown), which protects remaining parts during the etch process, is not remained in the vicinity of the parts E. Therefore, the layers are etched in areas not to be etched. To solve the problems, the photoresist layer should have a thickness of about 3.3 μm, but the photoresist usually has a thickness of about 2.7 μm. Accordingly, the margin of the photoresist layer is small and the size of the third contact hole 57 changes.

The drain and capacitor contact holes 53 and 55, the transmissive hole 48, and data pad contact hole 59 are over-etched during the etch process in the vicinity of parts E.

SUMMARY OF THE INVENTION

Accordingly, the present invention is directed to a manufacturing method of an array substrate for a transflective liquid crystal display (LCD) device that substantially obviates one or more of problems due to limitations and disadvantages of the related art.

An advantage of the present invention is to provide a manufacturing method of an array substrate for a transflective liquid crystal display (LCD) device that improves etching qualities.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a manufacturing method of an array substrate for a transflective liquid crystal display device includes forming a gate line and a gate electrode on a substrate; forming a gate insulator on the gate line and the gate electrode; forming an active layer on the gate insulator; forming an ohmic contact layer on the active layer; forming a data line, source and drain electrodes on the ohmic contact layer; depositing a first passivation layer made of a first material on the data line, source and drain electrodes; depositing a second passivation layer made of a second material on the first passivation layer; patterning the second passivation layer, thereby forming a first drain contact hole exposing the first passivation layer over the drain electrode; forming a reflector on the second passivation layer, the reflector having a first transmissive hole; patterning the first passivation layer, thereby forming a second drain contact hole exposing the drain electrode, wherein the second drain contact hole corresponds to the first drain contact hole; and forming a transparent electrode on the second passivation layer and on the reflector, the transparent electrode being connected to the drain electrode through the first and second drain contact holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A to 4F are cross-sectional views illustrating a method of manufacturing an array substrate for a related art transflective liquid crystal display (LCD) device;

DETAILED DESCRIPTION OF THE ILLUSTRATED EMBODIMENTS

Reference will now be made in detail to embodiments of the present invention, example of which are illustrated in the accompanying drawings.

Figure 1:
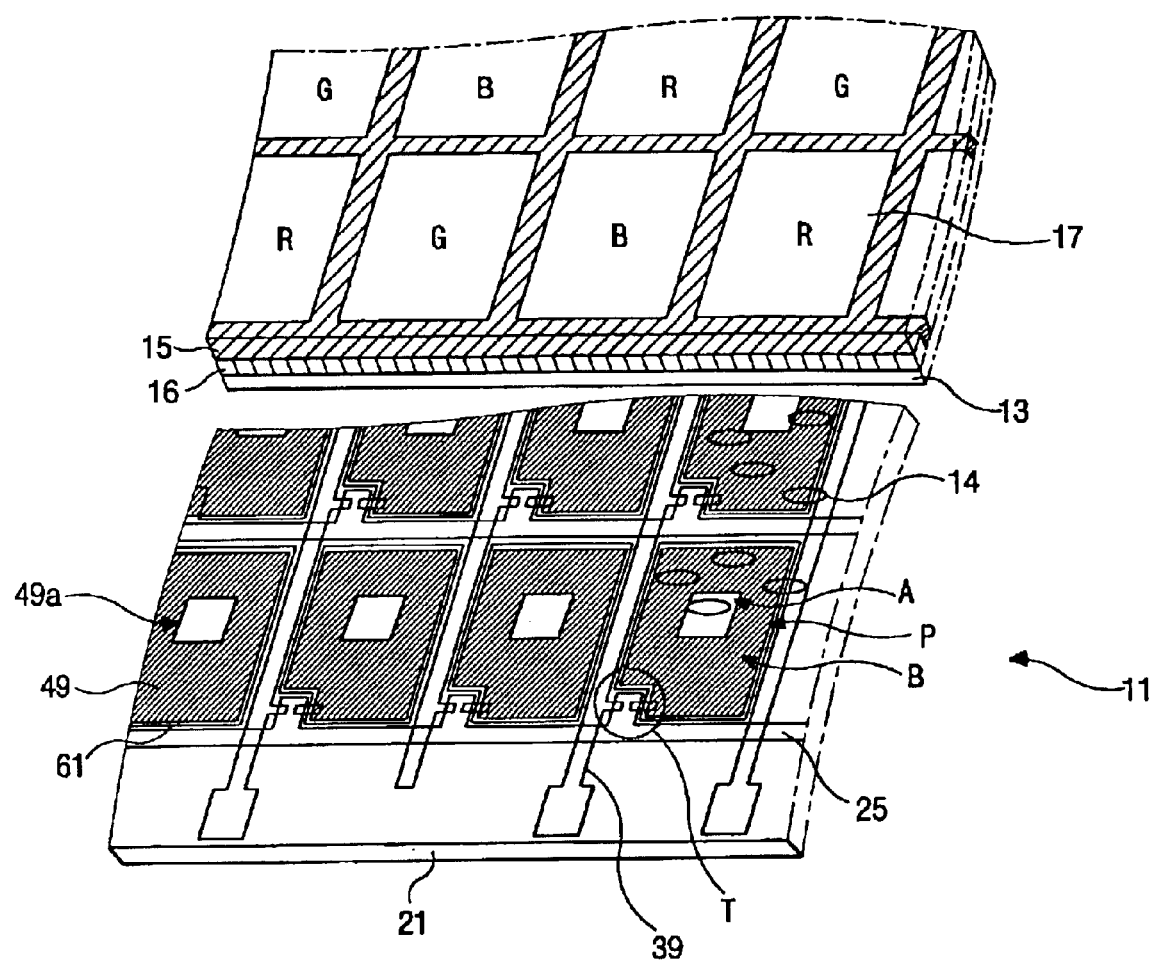
FIG. 1 is an exploded perspective view illustrating a related art transflective LCD device.
Figure 2:
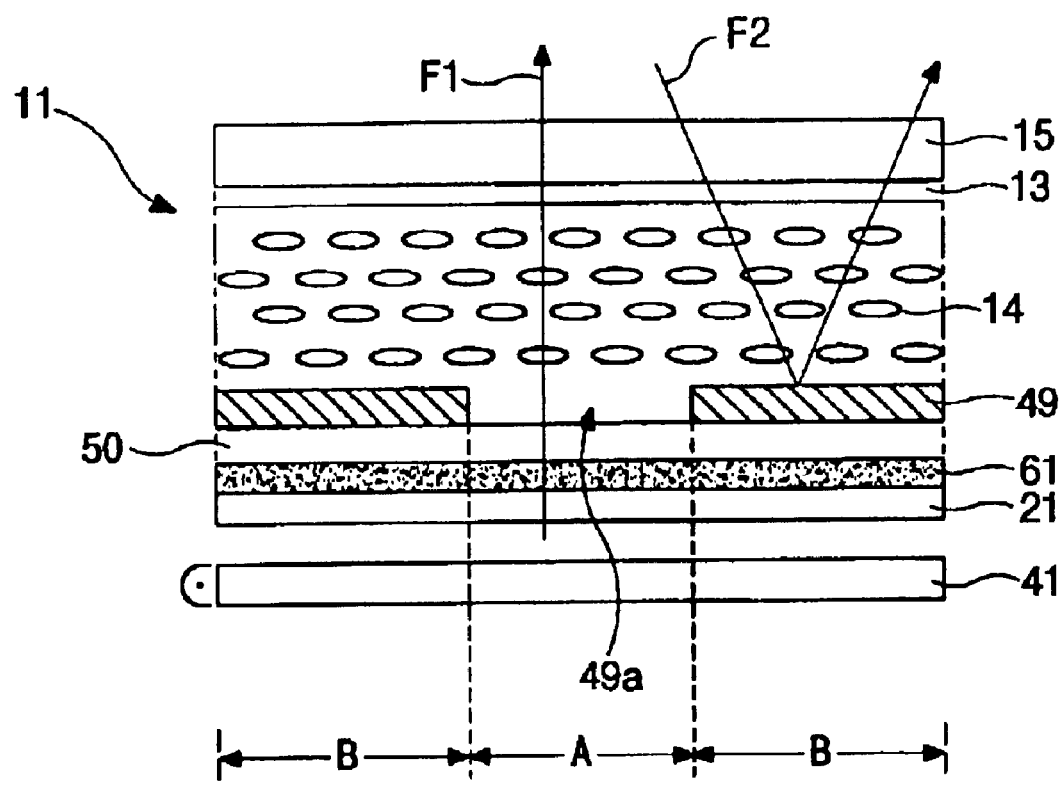
FIG. 2 is a schematically cross-sectional view of a related art transflective LCD device.
Figure 3:
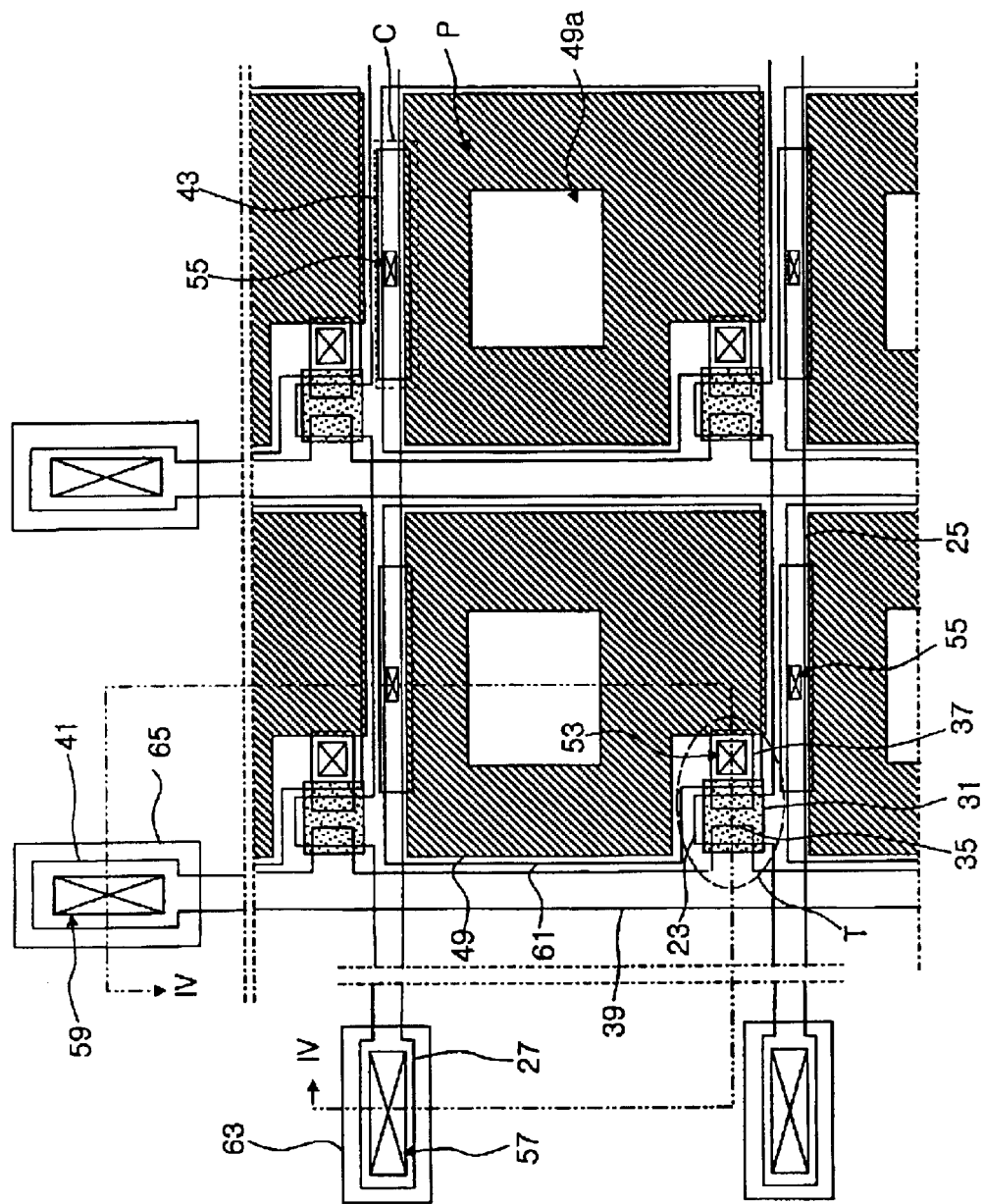
FIG. 3 is a plan view of an array substrate for a related art transflective liquid crystal display (LCD) device.
Figure 4E:
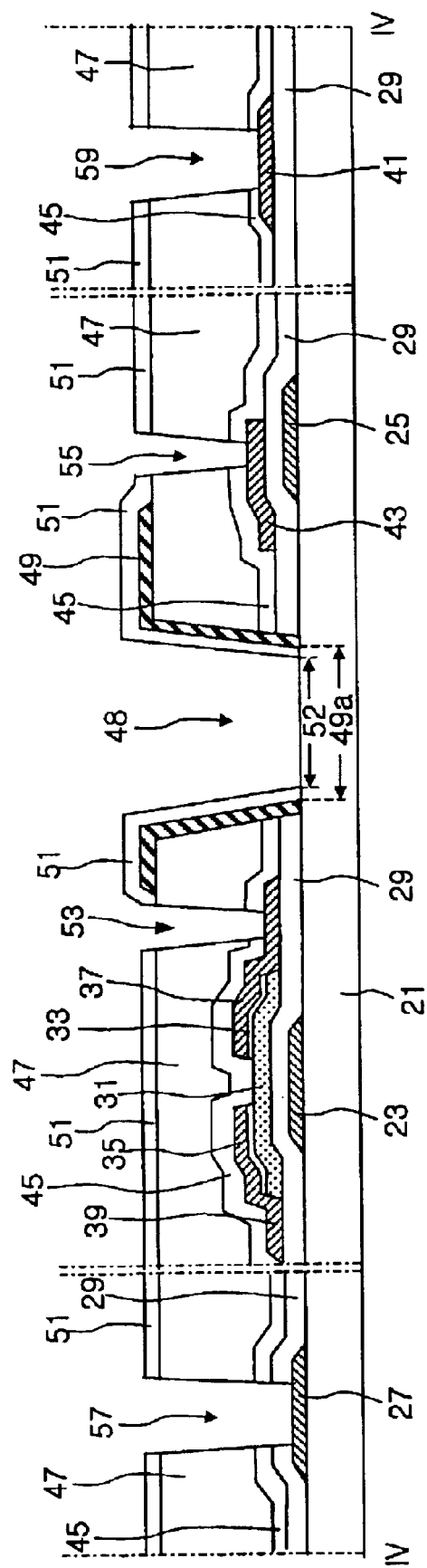
Figure 4F:
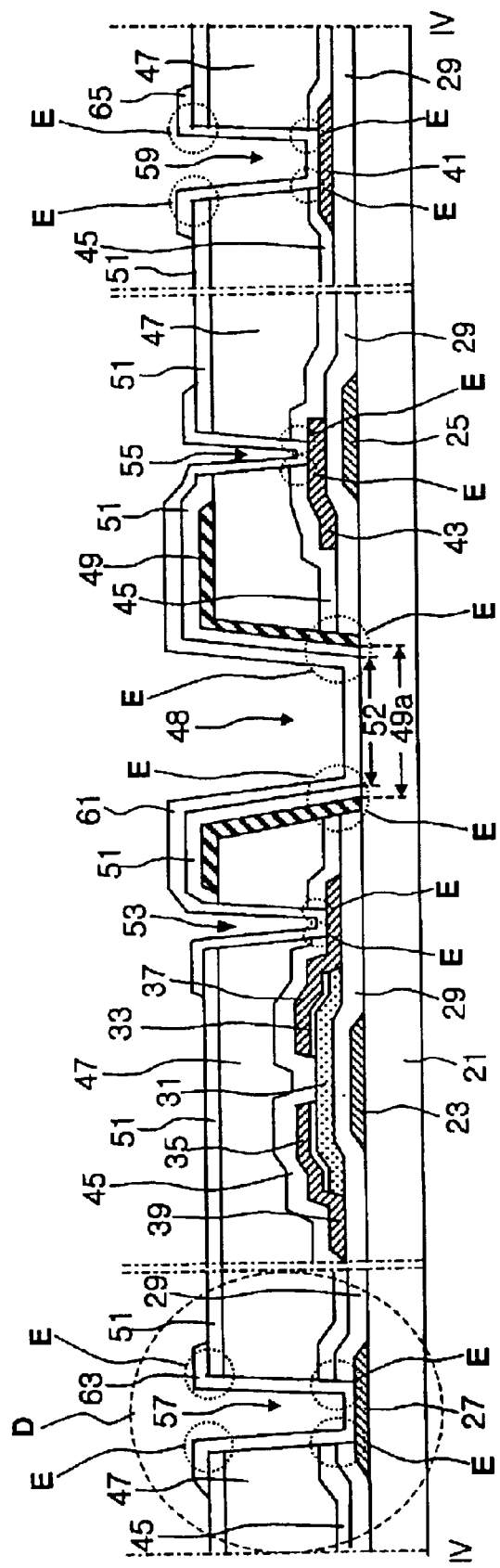
Figure 5:
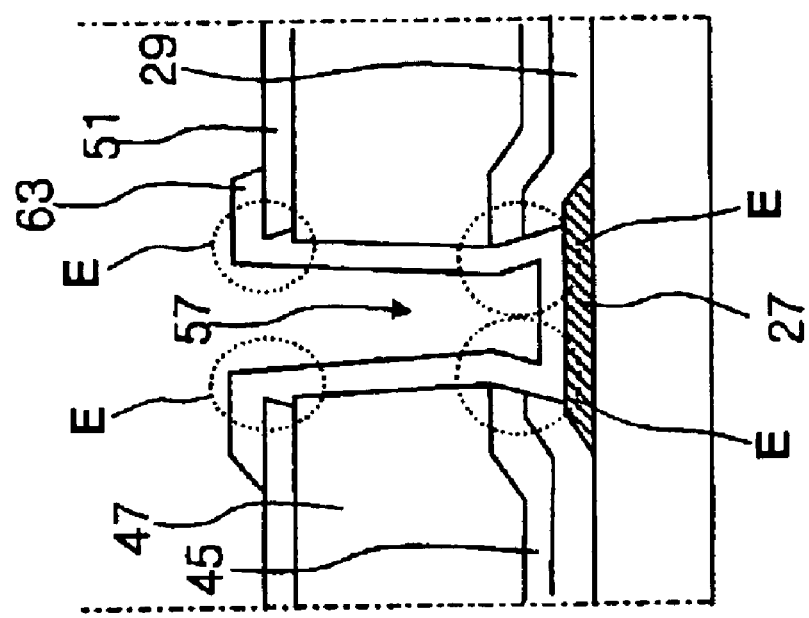
FIG. 5 is a cross-sectional view magnifying the gate pad area "D" of FIG. 4F.
Figure 6:
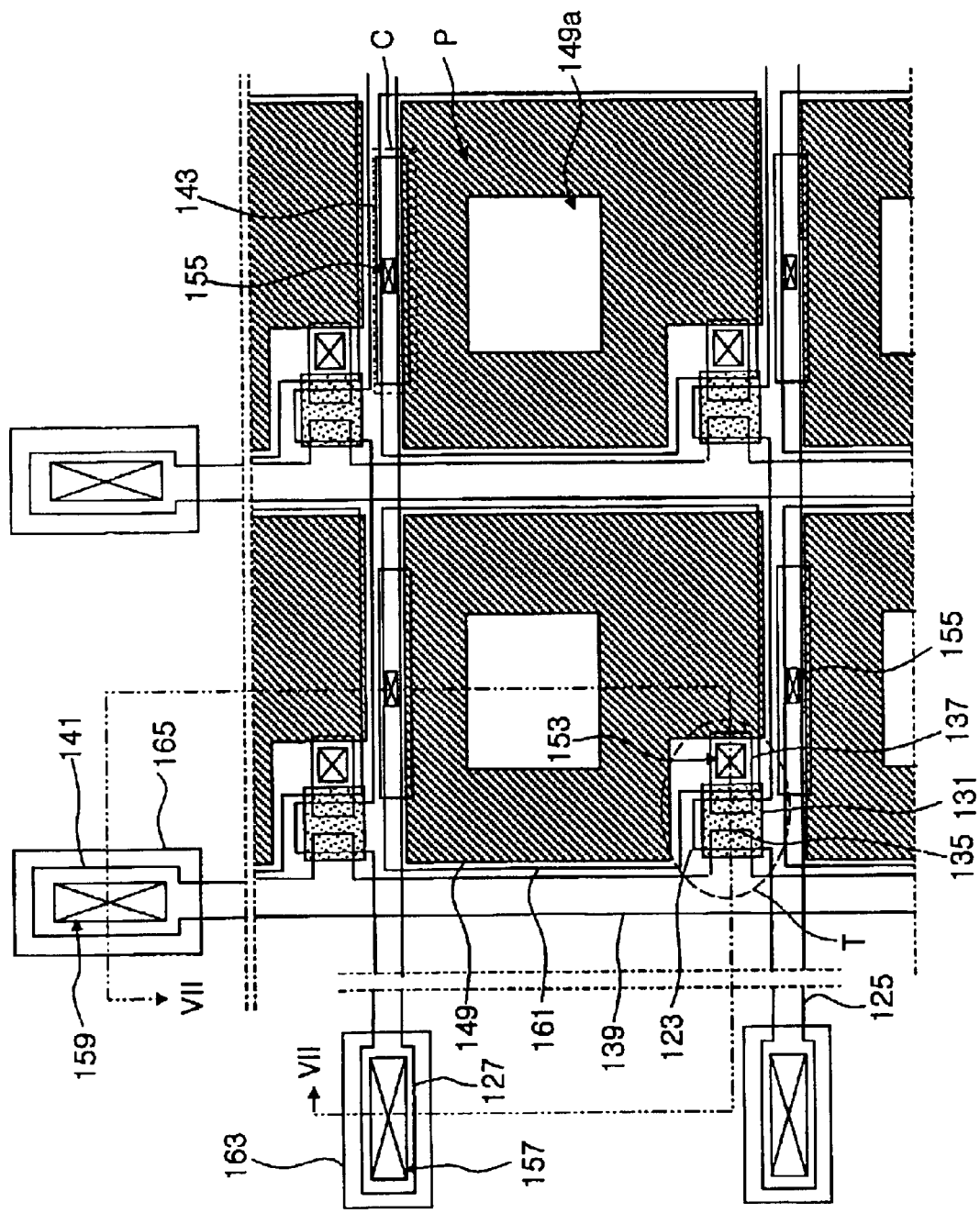
FIG. 6 is plan view of an array substrate for a transflective liquid crystal display (LCD) device according to the present invention.

FIG. 6 shows a plan view of an array substrate for a transflective liquid crystal display (LCD) device according to the present invention.

As shown in FIG. 6, a gate line 125 is formed horizontally in the context of the figure and a gate electrode 123 is connected to the gate line 125. A data line 139 is formed vertically in the context of the figure and a source electrode 135 and a drain electrode 137 are formed. The source electrode 135 is connected to the data line 139. The gate and data lines 125 and 139 cross each other and define a pixel region "P". The gate electrode 123, source electrode 135 and drain electrode 137 form a thin film transistor "T". The thin film transistor "T" includes an active layer 131.

In the pixel region "P", a reflector 149 and a transparent electrode 161 are formed. The reflector 149 has a transmissive hole 149a, which defines a transmissive region. The transparent electrode 161 overlaps the drain electrode 137 and is connected to the drain electrode 137 through a drain contact hole 153. The transparent electrode 161 is a pixel electrode of driving liquid crystal molecules.

A capacitor electrode 143 is formed overlapping the gate line 125. The capacitor electrode 143 is connected to the transparent electrode 161 through a capacitor contact hole 155. The capacitor electrode 143 forms a storage capacitor "C" with the overlapped gate line 125.

A gate pad 127 is formed at one end of the gate line 125 and a data pad 141 is also formed at one end of the data line 139. A gate pad terminal 163 and a data pad terminal 165, which overlap the gate pad 127 and the data pad 141, respectively, are formed. The gate pad terminal 163 is larger than the gate pad 127 and is connected to the gate pad 127 through a gate pad contact hole 157. The data pad terminal 165 is larger than the data pad 141 and is connected to the data pad 141 through a data pad contact hole 159.

FIGS. 7A to 7F illustrate a method of manufacturing an array substrate for a transflective liquid crystal display (LCD) device according to the present invention, and correspond to cross-sections along the line VII—VII of FIG. 6.

Figure 7A:
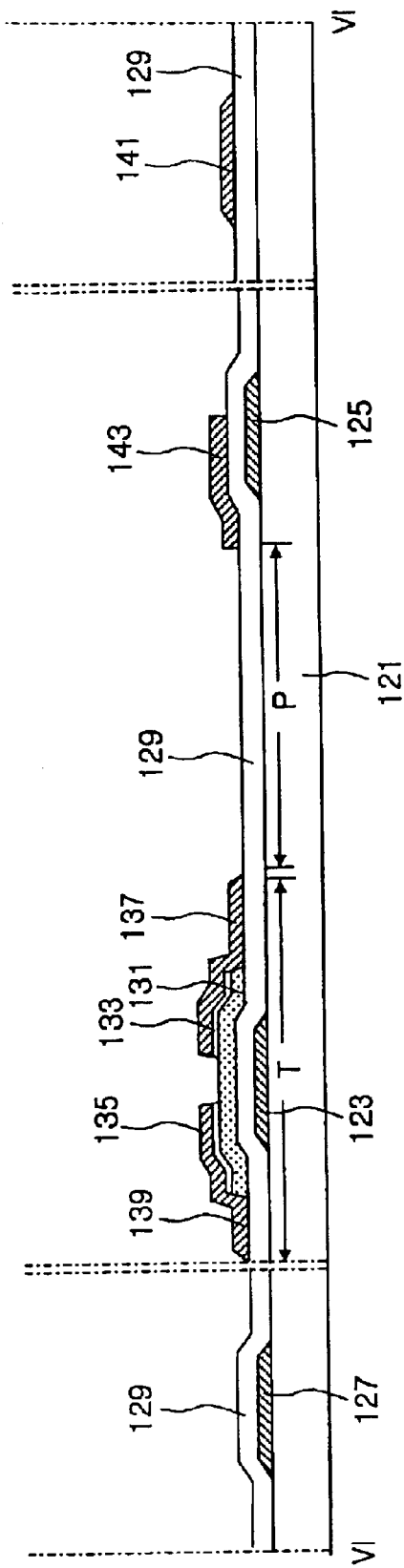
FIGS. 7A to 7F are cross-sectional views illustrating a method of manufacturing an array substrate for a transflective liquid crystal display (LCD) device according to the present invention.

In FIG. 7A, a gate electrode 123, a gate line 125 and a gate pad 127 are formed on a substrate 121. Though not shown in the figure, the gate electrode 123 is connected to the gate line 125 and the gate pad 127 is disposed at one end of the gate line 125. The gate electrode 123, the gate line 125 and the gate pad 127 may be formed of a metal material such as aluminum (Al), aluminum alloy such as aluminum-neodymium (AlNd), tungsten (W), chromium (Cr), and molybdenum (Mo). The substrate 121 is made of glass or plastic. A gate insulator 129 of about 400 nm is formed on the gate electrode 123, the gate line 125 and the gate pad 127. The gate insulator 129 is made of silicon nitride (SiNx) or silicon oxide ($SiO_2$).

Next, an active layer 131 and an ohmic contact layer 133 are subsequently formed on the gate insulator 129. The active layer 131 and the ohmic contact layer 133 are disposed over the gate electrode 123. The active layer 131 is made of amorphous silicon and the ohmic contact layer 133 is made of doped amorphous silicon.

A data line 139, source and drain electrodes 135 and 137 are formed on the ohmic contact layer 133. Also, a capacitor electrode 143 and a data pad 141 are formed on the gate insulator 129. As stated above, the data line 139 crosses the gate line 125 to define a pixel region "P". The data line 139, source and drain electrodes 135 and 137 are made of a metal material such as chromium (Cr), molybdenum (Mo), titanium (Ti), tungsten (W), aluminum (Al), and aluminum alloy such as aluminum-neodymium (AlNd). The capacitor electrode 143 and a data pad 141 are made of substantially the same material as the source and drain electrodes 135 and 137. The source and drain electrodes 135 and 137 form a thin film transistor "T" with the gate electrode 123. The capacitor electrode 143 overlaps the gate line 125 to form a storage capacitor.

Figure 7B:
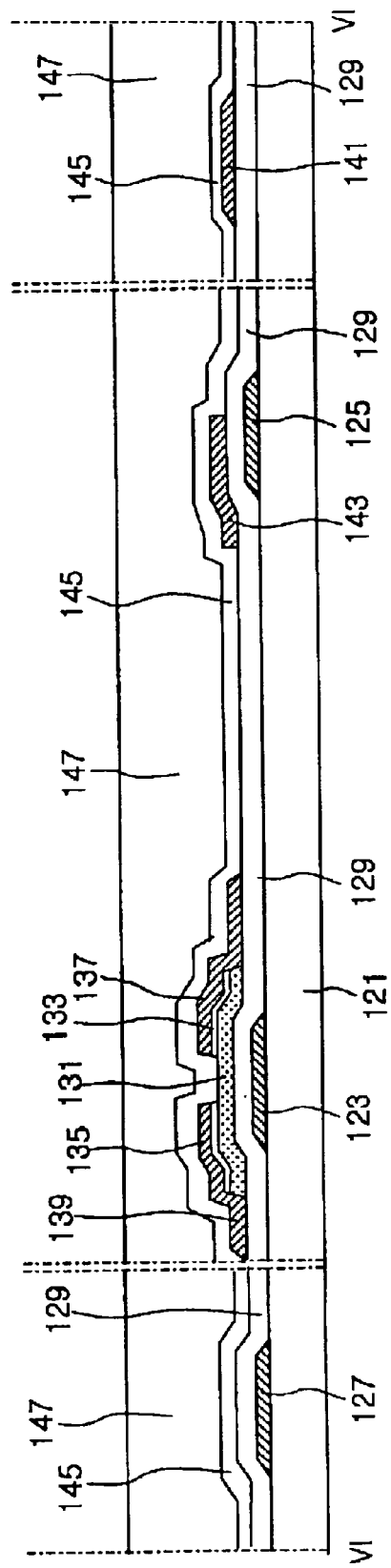

As shown in FIG. 7B, a first passivation layer 145 is formed on the data line 139, the source and drain electrodes 135 and 137, the capacitor electrode 143, and the data pad 141. Next, a second passivation layer 147 is formed on the first passivation layer 145. The first passivation layer 145 is made of an inorganic material such as silicon nitride (SiNx) or silicon oxide (SiO$_2$). This is because there are few traps in the interface of an insulator including silicon (Si) and a silicon layer. Therefore, carrier mobility in the active layer 131 increases. The second passivation layer 147 flattens the surface of the substrate 121 having the thin film transistor "T".

Figure 7C:
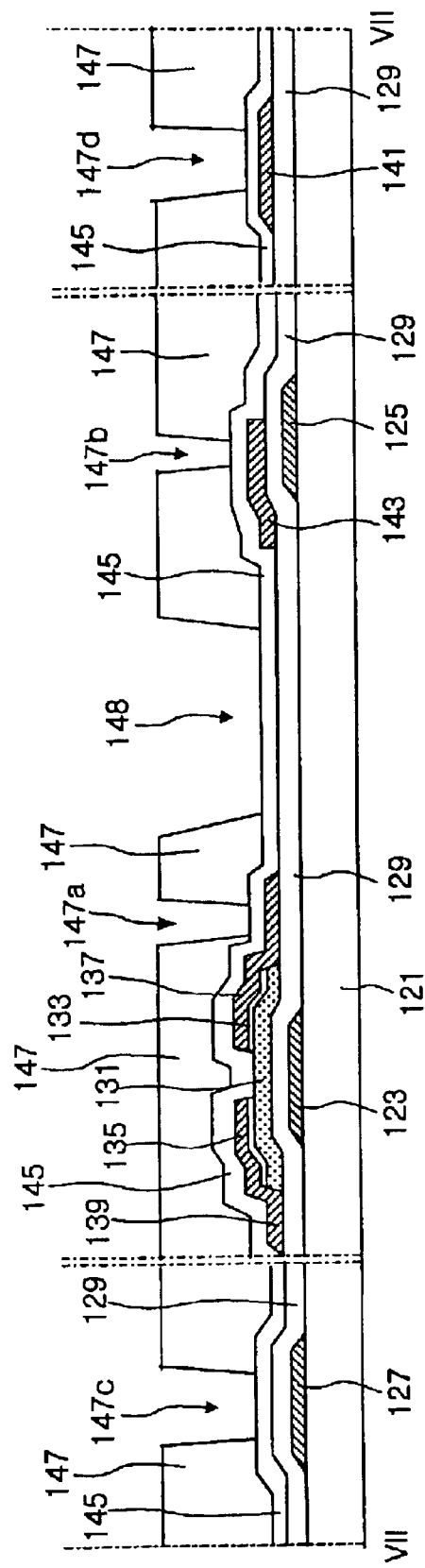

Next, in FIG. 7C, the second passivation layer 147 is patterned through a process such as photolithography, so that a first transmissive hole 148 is formed. A first drain contact hole 147a, a first capacitor contact hole 147b, a first gate pad contact hole 147c and a first data pad contact hole 147d are also formed. The first passivation layer 145 is exposed by the first transmissive hole 148. The first transmissive hole 148 makes a thickness of a liquid crystal layer in a transmissive region thicker than that of a liquid crystal layer in a reflective region, and so equalizes the brightness of a transmissive mode with the brightness of a reflective mode. The first drain contact hole 147a also exposes the first passivation layer 145 over the drain electrode 137, the first capacitor contact hole 147b exposes first passivation layer 145 over the capacitor electrode 142, the first gate pad contact hole 147c exposes the first passivation layer 145 over the gate pad 127, and the first data pad contact hole 147d exposes the first passivation layer 145 over the data pad 141. The first contact holes 147a, 147b, 147c and 147d may have a taper, a lower width of which is narrower than an upper width. Here, the first passivation 145 may be partially patterned. That is, the second passivation layer 147 is completely patterned and the first passivation layer 145 remains partially in the first contact holes 147a, 147b, 147c and 147d and the first transmissive hole 148.

Figure 7D:
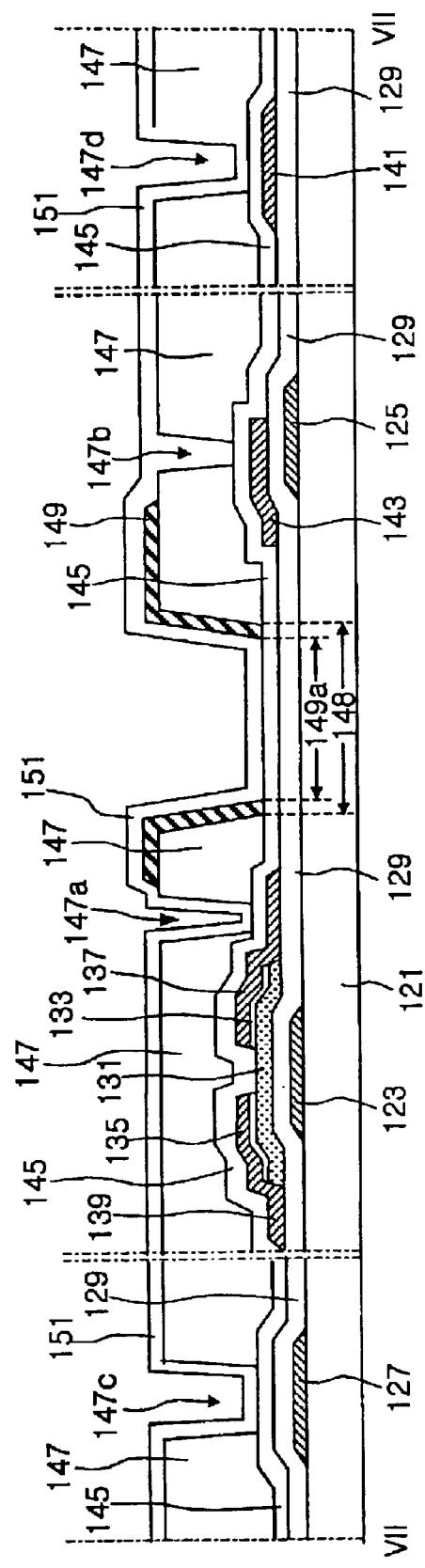

In FIG. 7D, a reflector 149 is formed on the second passivation layer 147 by depositing a metal and patterning it. A third passivation layer 151 is formed on the reflector 149. The reflector 149 has a second transmissive hole 149a corresponding to the first transmissive hole 148. The reflector 149 may be made of a metal such as aluminum (Al) or an alloy of aluminum and neodymium (AlNd), which reflects light well. The third passivation layer 151 has a thickness of about 150 nm and is made of an inorganic material such as silicon nitride (SiNx) and silicon oxide (SiO$_2$).

Figure 7E:
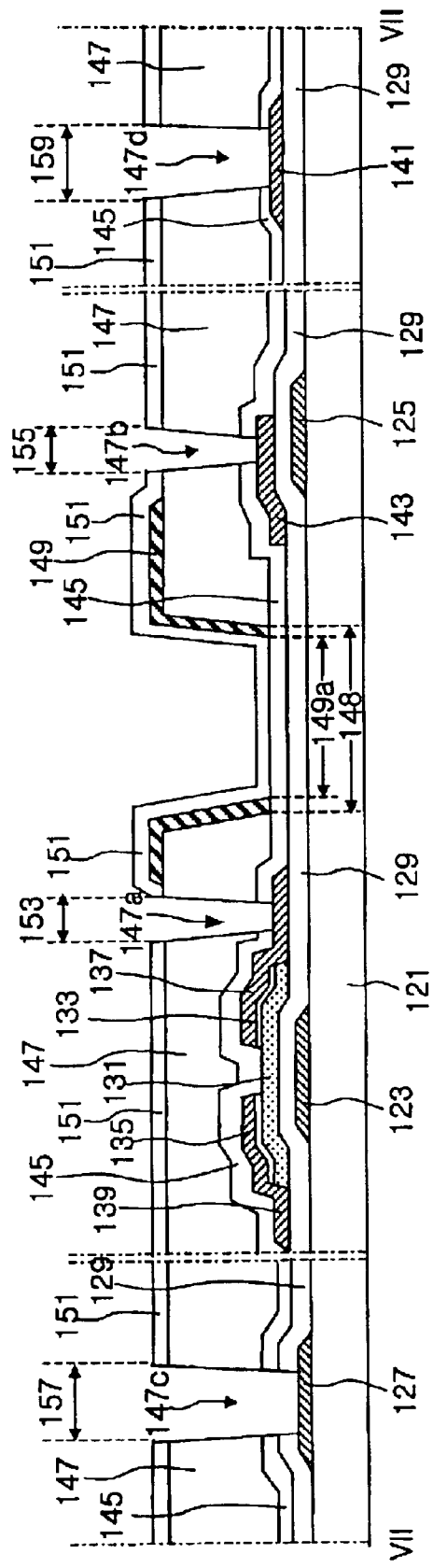

In FIG. 7E, the third passivation layer 151 and the first passivation layer 145 made of the same material are patterned simultaneously, so that a second drain contact hole 153, a second capacitor contact hole 155, a second gate pad contact hole 157 and a second data pad contact hole 159 are formed. The second drain, capacitor, gate pad and data pad contact holes 153, 155, 157 and 159 correspond to the first drain, capacitor, gate pad and data pad contact holes 147a, 147b, 147c and 147d, respectively. Here, the gate insulator 129 is also simultaneously patterned to form the second gate pad contact hole 157.

Figure 7F:
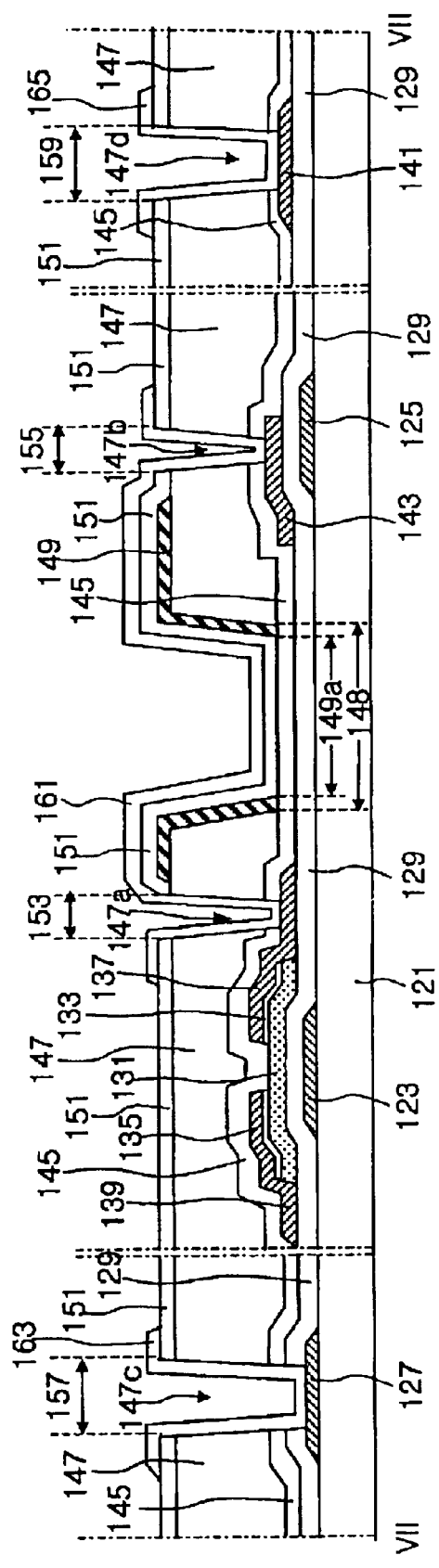

As shown in FIG. 7F, a transparent electrode 161, a gate pad terminal 163 and a data pad terminal 165 are formed. The transparent electrode 161 is connected to the drain electrode 137 through the first and second drain contact holes 147a and 153. The transparent electrode 161 is also connected to the capacitor electrode 143 through the first and second capacitor contact holes 147b and 155. The gate pad terminal 163 is connected to the gate pad 127 through the first and second gate pad contact holes 147c and 157. The data pad terminal 165 is connected to the data pad 141 through the first and second data pad contact holes 147d and 159. The transparent electrode 161, the gate pad terminal 163 and the data pad terminal 165 may be made of a transparent conducting material such as indium-tin-oxide (ITO) and indium-zinc-oxide (IZO).

Figure 8:
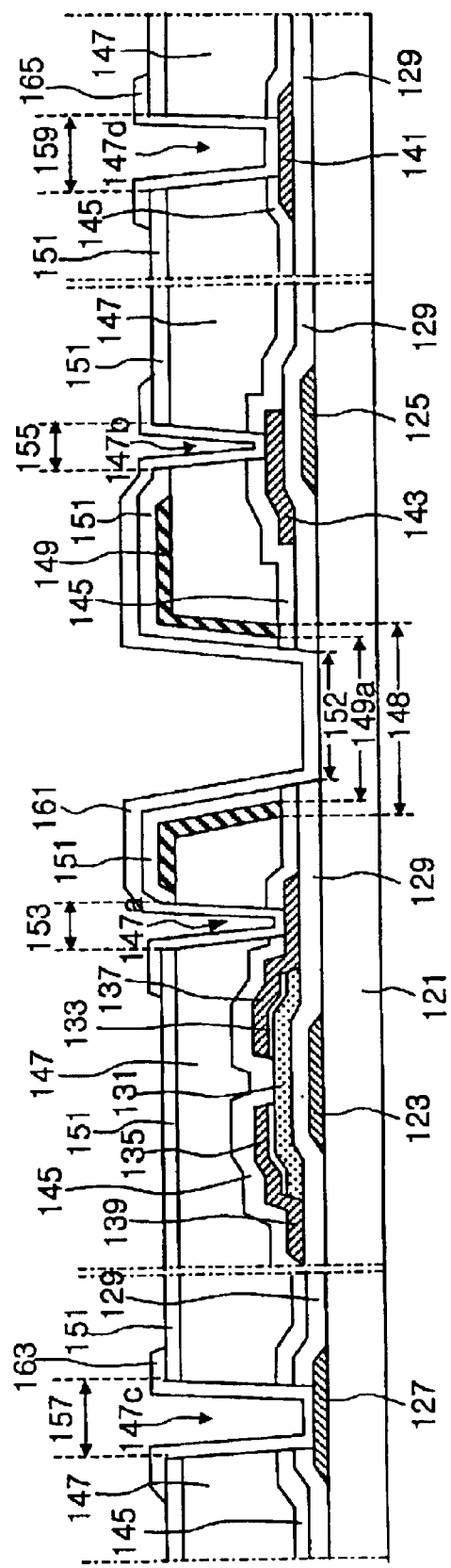
FIG. 8 is a cross-sectional view illustrating another array substrate for a transflective liquid crystal display (LCD) device according to the present invention.

FIG. 8 is a cross-sectional view illustrating another array substrate for a transflective liquid crystal display (LCD) device according to the present invention.

In FIG. 8, a third transmissive hole 152 is also formed by patterning the third passivation layer 151 and the third transmissive hole 152 corresponds to the first and second transmissive holes 148 and 149a. Here, the first passivation layer 145 and the gate insulator 129 made of the same material with the third passivation layer 151 are also patterned to form the third transmissive hole 152 and the substrate 121 is exposed by the third transmissive hole 152.

In the present invention, after the second passivation layer of an organic material is patterned, the third passivation layer, the first passivation layer and the gate insulator of an inorganic material are patterned in order to form the contact holes. Therefore, the etching qualities can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A manufacturing method of an array substrate for a transflective liquid crystal display device, comprising:

forming a gate line and a gate electrode on a substrate;

forming a gate insulator on the gate line and the gate electrode;

forming an active layer on the gate insulator;

forming an ohmic contact layer on the active layer;

forming a data line, source and drain electrodes on the ohmic contact layer;

depositing a first passivation layer made of a first material on the data line, source and drain electrodes;

depositing a second passivation layer made of a second material on the first passivation layer;

patterning the second passivation layer, thereby forming a first drain contact hole over the drain electrode;

forming a reflector on the second passivation layer, the reflector having a first transmissive hole;

patterning the first passivation layer, thereby forming a second drain contact hole exposing the drain electrode, the second drain contact hole corresponding to the first drain contact hole; and forming a transparent electrode on the second passivation layer and on the reflector, the transparent electrode being connected to the drain electrode through the first and second drain contact holes.

2. The method according to claim 1, wherein the second material includes one of benzocyclobutene (BCB) and acrylic resin.

3. The method according to claim 2, wherein the first material includes one of silicon nitride (SiNx) and silicon oxide ($SiO_2$).

4. The method according to claim 2, wherein patterning the second passivation layer includes forming a second transmissive hole, the second transmissive hole corresponding to the first transmissive hole.

5. The method according to claim 1, further comprising forming a third passivation layer made of the first material after the forming the reflector.

6. The method according to claim 5, wherein forming the third passivation layer includes forming a third drain contact hole, the third drain contact hole formed with the second drain contact hole simultaneously by a one step etching process.

7. The method according to claim 1, wherein forming the gate line and the gate electrode includes forming a gate pad, the gate pad being connected to one end of the gate line.

8. The method according to claim 7, wherein patterning the second passivation layer includes forming a first gate pad contact hole, the first gate pad contact hole formed over the gate pad.

9. The method according to claim 8, wherein a second gate pad contact hole is formed through the first passivation layer and the gate insulator simultaneously thereby exposing the gate pad, the second gate pad contact hole corresponding to the first gate pad contact hole.

10. The method according to claim 9, further comprising forming a gate pad terminal, the gate pad terminal being connected to the gate pad through the first and second gate pad contact holes.

11. The method according to claim 10, wherein the gate pad terminal is made of substantially the same material as the transparent electrode.

12. The method according to claim 1, wherein forming the data line, source and drain electrodes includes forming a data pad, the data pad being connected to one end of the data line.

13. The method according to claim 12, wherein patterning the second passivation layer includes forming a first data pad contact hole over the data pad.

14. The method according to claim 13, wherein patterning the first passivation layer includes forming a second data pad contact hole exposing the data pad, the second data pad contact hole corresponding to the first data pad contact hole.

15. The method according to claim 14, further comprising forming a data pad terminal, the data pad terminal being connected to the data pad through the first and second data pad contact holes.

16. The method according to claim 15, wherein the data pad terminal is made of substantially the same material as the transparent electrode.

17. The method according to claim 1, wherein forming the data line, source and drain electrodes includes forming a capacitor electrode, the capacitor electrode overlapping the gate line.

18. The method according to claim 17, wherein patterning the second passivation layer includes forming a first capacitor contact hole over the capacitor electrode.

19. The method according to claim 18, wherein patterning the first passivation layer includes forming a second capacitor contact hole exposing the capacitor electrode, the second capacitor contact hole corresponding to the first capacitor contact hole.

20. The method according to claim 19, wherein the transparent electrode is connected to the capacitor electrode through the first and second capacitor contact holes.

21. The method according to claim 1, wherein the reflector includes one of aluminum (Al) and an alloy of aluminum-neodymium (AlNd).

22. The method according to claim 1, wherein the transparent electrode includes one of indium-tin-oxide (ITO) and indium-zinc-oxide (IZO).

* * * * *

UNITED STATES PATENT AND TRADEMARK OFFICE
CERTIFICATE OF CORRECTION

PATENT NO. : 6,888,597 B2  Page 1 of 1
DATED : May 3, 2005
INVENTOR(S) : Kyoung S. Ha et al.

It is certified that error appears in the above-identified patent and that said Letters Patent is hereby corrected as shown below:

Title page,
Item [75], Inventors, "Houm-il Baek" should read -- Heum-il Baek --.

Signed and Sealed this

Twenty-second Day of November, 2005

JON W. DUDAS
*Director of the United States Patent and Trademark Office*